US006878298B2

(12) United States Patent
Umehara

(10) Patent No.: US 6,878,298 B2
(45) Date of Patent: Apr. 12, 2005

(54) INK JET RECORDING HEAD AND METHOD FOR MANUFACTURING THE SAME

(75) Inventor: Shigeru Umehara, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/670,517

(22) Filed: Sep. 26, 2003

(65) Prior Publication Data

US 2004/0055996 A1 Mar. 25, 2004

Related U.S. Application Data

(62) Division of application No. 09/939,647, filed on Aug. 28, 2001, which is a division of application No. 09/535,741, filed on Mar. 27, 2000, now Pat. No. 6,334,671.

(30) Foreign Application Priority Data

Mar. 25, 1999 (JP) .......................................... 11-081064

(51) Int. Cl.[7] ......................... G01D 15/00; G11B 5/127
(52) U.S. Cl. ............................. 216/27; 216/41; 216/56; 347/70; 347/84; 347/92; 29/890.1; 438/21
(58) Field of Search ............................. 347/70, 84, 92; 216/27, 41, 56; 29/890.1; 438/21

(56) References Cited

U.S. PATENT DOCUMENTS

| | | | | |
|---|---|---|---|---|
| 4,828,184 A | | 5/1989 | Gardner et al. | |
| 5,028,514 A | | 7/1991 | Johannsen | |
| 5,449,114 A | | 9/1995 | Wells et al. | |
| 6,527,370 B1 | | 3/2003 | Courian et al. | |
| 6,789,319 B2 | * | 9/2004 | Furuhata et al. | 29/890.1 |

FOREIGN PATENT DOCUMENTS

| | | | |
|---|---|---|---|
| EP | 0 652 108 | A2 | 11/1994 |
| EP | 0 799 699 | A2 | 4/1997 |
| EP | 799699 | A2 | 8/1997 |
| EP | 1 005 986 | A1 | 6/1999 |
| EP | 1005986 | A1 | 7/2000 |
| JP | 5-338168 | | 12/1993 |
| JP | 6-55733 | | 3/1994 |
| JP | 7-276625 | | 10/1995 |
| JP | 7-314668 | | 12/1995 |
| JP | 09-277527 | | 10/1997 |
| JP | 10-119300 | | 5/1998 |
| WO | WO99/65689 | | 12/1999 |

OTHER PUBLICATIONS

Japanese Office Action dated Dec. 20, 2001 with partial English translation.

* cited by examiner

*Primary Examiner*—P. Hassanzadel
*Assistant Examiner*—Maureen G. Arancibia
(74) *Attorney, Agent, or Firm*—McGinn & Gibb, PLLC

(57) ABSTRACT

In a method for manufacturing an ink jet recording head provided with a pressure generating chamber, this chamber includes a through-hole of a chamber plate and a pair of plates, between which plates the chamber plate is sandwiched. The processing step for forming this through-hole further includes the sub-steps of forming a first resist film and a second resist film on a first and a second surface of the chamber plate, respectively, wherein the resist films assume substantially a same shape, but are different in length from each other when measured in a direction parallel to a flow direction of ink, and etching away both the first and second surface of the chamber plate using the resist films as its masks so that the through-hole is formed in the chamber plate and serves as the pressure generating chamber.

8 Claims, 8 Drawing Sheets

INK JET RECORDING HEAD AND METHOD FOR MANUFACTURING THE SAME

The present Application is a Divisional Application of U.S. patent application Ser. No. 09/939,647 filed on Aug. 28, 2001, which is a Divisional Application of U.S. patent application Ser. No. 09/535,741 filed on Mar. 27, 2000 now U.S. Pat. No. 6,334,671.

BACKGROUND OF THE INVENTION

1. Field of the Invention

The present invention relates to an ink jet recording head used in an ink jet recording apparatus such as ink jet printers or like recording apparatuses, and also relates to a method for manufacturing such an ink jet recording head, wherein, in operation, the ink jet recording head records an object, for example characters, images, patterns or like on a recording medium or sheet by ejecting ink droplets from an ink ejection nozzle of the ink jet recording head to realize a high quality gradation printing operation.

2. Description of the Related Art

Of various types of recording methods, a non-impact recording method is a favorable one since it is substantially free from any noise in recording operation. In recent years, the use of such the non-impact recording method in numerous applications has dramatically increased. Consequently, such non-impact recording method shows a wide variation in types. Of these types of the non-impact recording method, an ink jet recording method is advantageous in that: it is capable of directly recording any desired characters, images, patterns or like on a recording medium or sheet at a high recording speed through an ink jet recording apparatus with a simple construction in which the ink jet recording method is carried out; and, further, it is also capable of using ordinary paper as its recording medium or sheet, and therefore excellent in ease of use.

Heretofore, various types of the ink jet recording methods have been proposed, one of which is well known and carried out by the ink jet recording apparatus or printer. In such the ink jet recording apparatus or printer, ink droplets are ejected from an ink ejection nozzle of the ink jet recording head thereof to adhere to the recording medium such as paper, sheets or the like, so that the desired characters, images, patterns or the like are recorded on such recording media. This type of ink jet recording method is advantageous in that it is capable of: performing its recording operation at high speed; and, using ordinary paper as its recording medium without having such ordinary paper treated through a special fixing treatment in recording operation. Heretofore, numerous forms of ink jet recording apparatuses or printers for carrying out the above-mentioned ink jet recording methods have been proposed and commercially manufactured.

The ink jet recording methods are substantially classified into three major types: namely, a continuous ejection type; an on-demand type; and, an electrostatic absorption type. In the on-demand type ink jet recording method, a piezoelectric element of the ink jet recording apparatus for carrying out the on-demand type method is energized only at a predetermined moment or time when it is required, so that the ink droplets are ejected from the ink ejection nozzle of the ink jet recording apparatus at the above predetermined moment. As a result, the ink jet recording apparatus or printer for carrying out the on-demand type ink jet recording method is improved in ink consumption properties, and very simple in construction. Therefore, it is to be expected that such an on-demand type ink jet recording apparatus or printer will be widely used.

In this on-demand type of the ink jet recording apparatus, its conventional type ink jet recording head is constructed of: a pressure generating chamber which communicates with an ink reservoir; the ink ejection nozzle which communicates with the pressure generating chamber; a vibrating plate which forms a portion of the pressure generating chamber; and, the piezoelectric element which causes the vibrating plate to vibrate to intermittently increase a pressure in an interior of the pressure generating chamber to produce a pressure pulse therein, wherein such the pressure pulse forces ink of the pressure generating chamber to be ejected through the ink ejection nozzle outward and formed into the ink droplets.

In the conventional ink jet recording head through which the above-mentioned ink jet recording method is carried out, each of the pressure generating chamber, ink reservoir, ink ejection nozzle or like essential parts is formed by stacking a plurality of its components or plates into a pile. In this pile, each of the components or plates has been subjected to: an etching process performed from one surface of the component or plate to an other surface thereof; a stamping process performed by a machine punch or like press machines; an electroforming process; or, like processes, and thereby assuming a desired shape suitable for formation of above-mentioned individual essential parts of the conventional ink jet recording head.

FIG. 8 shows a cross-sectional view of an essential part of an example of the conventional ink jet recording head, illustrating the pressure generating chamber and the peripheral portions thereof. As is clear from FIG. 8, the conventional ink jet recording head is constructed of: a vibrating plate 60; a chamber plate 61 for forming the pressure generating chamber; and, an ink supply plate 62 for forming both an ink inlet passage 65 and an ink outlet passage 66, wherein these plates 60, 61 and 62 are stacked upon one another and firmly combined with each other to form the ink inlet passage 65, a pressure generating chamber 63, and the ink outlet passage 66; the ink inlet passage 65 receives the ink from the ink reservoir (not shown); the pressure generating chamber 63 is communicated with both the ink inlet passage 65 and the ink outlet passage 66; and, through the ink outlet passage 66, the ink is delivered to the ink ejection nozzle (not shown in FIG. 8).

In the conventional ink jet recording head having the above construction, a blank of the chamber plate 61 is subjected to the stamping operation performed by the machine punch. As a result, the above blank is provided with a through-hole defined by an inner edge surface 61*a*, and is therefore formed into the chamber plate 61. As viewed in FIG. 8, this inner edge surface 61*a* extends in a direction perpendicular to an upper or major surface of the chamber plate 61. The pressure generating chamber 63 is formed by closing both upper and lower openings of the above through-hole of the chamber plate 61 with the vibrating plate 60 and the ink supply plate 62, respectively. As for the ink inlet passage 65 and the ink outlet passage 66 both provided in the ink supply plate 62, each of these passages 65, 66 is formed through the stamping process performed by the machine punch, and thereby having its inner edge surface extending in a direction perpendicular to an upper or major surface of the ink supply plate 62, as is in the case of the above through-hole of the chamber plate 61.

Consequently, in operation of the conventional ink jet recording head having the above construction, the ink is supplied from the ink reservoir (not shown) through the ink inlet passage 65, pressure generating chamber 63 and the ink outlet passage 66, and has its flow path bent at substantially right angles on the midway to reach the ink ejection nozzle (not shown in FIG. 8).

Due to this, in the conventional ink jet recording head, there is a problem that some stagnation in the ink flow, formation of vapor bubbles, cavitation (which is caused by a large and sudden change in cross-sectional area of the ink flow passage), or like problems occur at corner portions 63*a*, 63*b* of the pressure generating chamber 63 and also in the vicinities of these corner portions 63*a*, 63*b*, wherein the corner portions 63*a*, 63*b* of the pressure generating chamber 63 directly receive the ink flow issued from the ink inlet passage 65 to have the ink flow bent at substantially right angles of its flow path. In case that the vapor bubbles and cavitation are produced in the ink flow at the corner portions 63*a*, 63*b* of the pressure generating chamber 63 in the conventional ink jet recording head, the piezoelectric element fails to build up a necessary pressure in the pressure generating chamber 63, because any pressure built up in the chamber 63 by energizing the piezoelectric element is absorbed by these vapor bubbles and cavitation. Consequently, in this case, the conventional ink jet recording head fails to have its ink properly ejected outward from its ink ejection nozzle, which makes it impossible to realize a high quality gradation expression of the ink droplets in recording operations.

In order to solve the above problems, it is necessary for the conventional ink jet recording head to have the through-hole of its chamber plate 61 (shown in FIG. 8) precisely positioned and stacked with the other components or plates in order to precisely form the ink passages together with the through-hole. Due to this, in the conventional ink jet recording head, it is necessary to have its components formed and assembled as precisely as possible. In other words, alignment in stacking of these components must be kept at the highest possible level.

SUMMARY OF THE INVENTION

In view of the above, it is an object of the present invention to provide an ink jet recording head and a method for manufacturing the same, which are capable of: preventing any stagnation in ink flow, formation of vapor bubbles, cavitation, or like problems from occurring in the ink flow of the ink jet recording head; realizing an excellent ink ejection operation, and therefore realizing a high quality gradation expression in recording operations; and, lessening a degree of required accuracy both in dimension and in alignment of its individual components which are assembled or stacked together to form the ink jet recording head of the present invention.

It is another object of the present invention to provide an ink jet recording head and a method for manufacturing the same, which are capable of forming an ink flow passage tilted or inclined from a major surface of its component or plate even when the ink flow passage is formed in the major surface of such component or plate through an etching operation.

According to a first aspect of the present invention, there is provided:

in a method for manufacturing an ink jet recording head provided with a pressure generating chamber, wherein the pressure generating chamber is constructed of a first plate or chamber plate, a second plate or vibrating plate and a third plate or ink supply plate, wherein the first plate is provided with a through-hole and sandwiched between the second and the third plate, the method comprising a step of forming the through-hole in the first plate, the improvement which comprises, in the step, the sub-steps of:

forming a first and a second resist film on a first and a second surface of the first plate, respectively, wherein the first and the second resist film assume substantially a same shape, but are different in length from each other when measured in a direction parallel to a flow direction of ink; and forming the through-hole in the first plate by etching both the first and the second surface of the first plate with the use of the first and the second resist film both of which serve as masks in the etching processing of the first plate.

In the foregoing, it is possible for the pressure generating chamber to obtain a relatively smooth inner wall surface therein by forming a first and a second hole portion, wherein the first and the second hole portions communicate with each other to form the pressure generating chamber, and assume substantially the same shape, but are slightly different in length from each other when measured in the direction parallel to the flow direction of the ink.

Consequently, in the pressure generating chamber having the above construction, particularly its upstream-side portion for receiving the ink flow, or its downstream-side portion for directing the ink flow to the ink ejection nozzle maybe smoothed in configuration. Due to such smoothed configuration, the ink jet recording head of the present invention is free from any problems such as stagnation in the ink flow, formation of vapor bubbles, cavitation, or like problems occurring in the ink flow in the pressure generating chamber. Consequently, it is possible for the ink jet recording head of the present invention to ensure an excellent ink ejection operation, and thereby realizing a high quality gradation expression in recording operations. Further, it is also possible for the ink jet recording head of the present invention to remarkably lessen an alignment accuracy required in a stacking or assembly operation of its plates or components.

More specifically, when one of its plates or components has a thickness of approximately 140 μm, it is preferable to set the difference in length between the first and the second resist film at a value ranging from approximately 80 to approximately 140 μm. In this case, it is possible for the pressure generating chamber to obtain an excellent configuration in its inner wall surface serving as an ink flow passage.

Consequently, it is preferable, in the above method of the present invention for manufacturing the ink jet recording head provided with the pressure generating chamber:

a thickness of the first plate is approximately 140 μm; and a difference in length between the first and the second resist film is within a range of from approximately 80 μm to approximately 140 μm.

According to a second aspect of the present invention, there is provided:

in a method for manufacturing an ink jet recording head provided with a pressure generating chamber, wherein the pressure generating chamber is constructed of a first plate or chamber plate, a second plate or vibrating plate and a third plate or ink supply plate, wherein the first plate is provided with a through-hole and sandwiched between the second and the third plate, wherein one of the second and the third plate is provided with an ink outlet passage in its ink discharge side, the method comprising a step of forming the ink outlet passage in the ink discharge side of one of the second and the third plates, the improvement which comprises, in the step, the sub-steps of:

forming a first and a second resist film on a first and a second surface of the first plate, respectively, wherein the first and the second resist film assume substantially the same shape, but are offset from each other in a direction parallel to a flow direction of ink; and forming the through-hole in the first plate by etching both the first and the second surface of the first plate with the use of the first and the second resist film both of which serve as masks in the etching processing of the first plate.

In the foregoing second aspect, it is possible to have the ink flow passage inclined at any desired angle relative to a major surface of one of the second and the third plate.

Preferably, in the above method of the present invention for manufacturing the ink jet recording head provided with the pressure generating chamber:

a thickness of the first plate is approximately 140 μm; and the first and the second resist film are offset from each other by a value ranging from approximately 40 μm to approximately 70 μm.

Also, according to a third aspect of the present invention, there is provided:

in an ink jet recording head provided with a pressure generating chamber, wherein the pressure generating chamber is constructed of a first plate or chamber plate, a second plate or vibrating plate and a third plate or ink supply plate, wherein the first plate is provided with a through-hole and sandwiched between the second and the third plate, the improvement wherein:

the through-hole is formed in the first plate by etching both a first and a second surface of the first plate, and therefore constructed of a first and a second hole portion thus formed through the etching processing, wherein the first and the second hole portion assume substantially a same shape, but are different in length from each other when measured in a direction parallel to a flow direction of ink within the pressure generating chamber.

In the foregoing third aspect, since the first and the second hole portion of the through-hole of the chamber plate are communicated with each other to provide a relatively smooth inner wall surface in the pressure generating chamber, the pressure generating chamber is capable of having both its upstream-side and its downstream-side portion smoothed in configuration, wherein the upstream-side portion receives the ink flow and changes it in flow direction so as to have a thus received ink flow directed to the downstream-side portion within the pressure generating chamber, while the downstream-side portion receives the thus directed ink flow and changes it in flow direction again so as to have the ink flow finally directed to the ink ejection nozzle. Consequently, due to the above-mentioned smoothed configuration of the inner wall surface of the pressure generating chamber, more specifically, of the upstream-side and the downstream-side portion thereof, it is possible for the ink jet recording head of the present invention to be free from any problems such as stagnation in the ink flow, formation of vapor bubbles, cavitation, or like problems all occurring in the ink flow in the pressure generating chamber.

Also, according to a fourth aspect of the present invention, there is provided:

in an ink jet recording head provided with a pressure generating chamber, wherein the pressure generating chamber is constructed of a first plate or chamber plate, a second plate or vibrating plate and a third plate or ink supply plate, wherein the first plate is provided with a through-hole and sandwiched between the second and the third plate, wherein one of the second and the third plates is provided with an ink outlet passage in its ink discharge side, the improvement wherein:

the ink outlet passage is formed in the third plate by etching both a first and a second surface of the third plate, wherein the ink outlet passage is constructed of a first and a second passage portion each assuming a substantially semi-spherical shape, wherein the first and the second passage portion are offset from each other in the direction parallel to a flow direction of ink.

In the foregoing fourth aspect, since the first and the second passage portion of the ink outlet passage are communicated with each other in a condition in which the first and the second passage portion are offset from each other in a direction parallel to the flow direction of ink, it is possible to have the ink outlet passage inclined at a desired angle in the above-mentioned one of the second and the third plate.

BRIEF DESCRIPTION OF THE DRAWINGS

The above and other objects, advantages and features of the present invention will be more apparent from the following description taken in conjunction with the accompanying drawings in which:

FIG. 6(*b*) is an enlarged cross-sectional view of the blank of the chamber plate used in the ink jet recording head of the present invention shown in FIG. 1, wherein the blank of the chamber plate has the predetermined portions of its resist films photo-patterned and removed;

FIG. 6(*c*) is an enlarged cross-sectional view of the blank of the chamber plate used in the ink jet recording head of the present invention shown in FIG. 1, illustrating the central portion of the blank of the chamber plate, which portion is uncovered with the resist films and therefore etched away to form the through-hole of the chamber plate;

FIG. 6(*d*) is an enlarged cross-sectional view of the blank of the chamber plate used in the ink jet recording head of the present invention shown in FIG. 1, illustrating the blank of the chamber plate, from which blank the remaining resist films are removed;

FIG. 7(*b*) is a bottom view of the second mask with its mask pattern used in mask-patterning processing of the blank of the chamber plate shown in FIG. 6(*a*)

DETAILED DESCRIPTION OF THE PREFERRED EMBODIMENTS

The best modes for carrying out the present invention will be described in detail using embodiments of the present invention with reference to the accompanying drawings.

Figure 1:
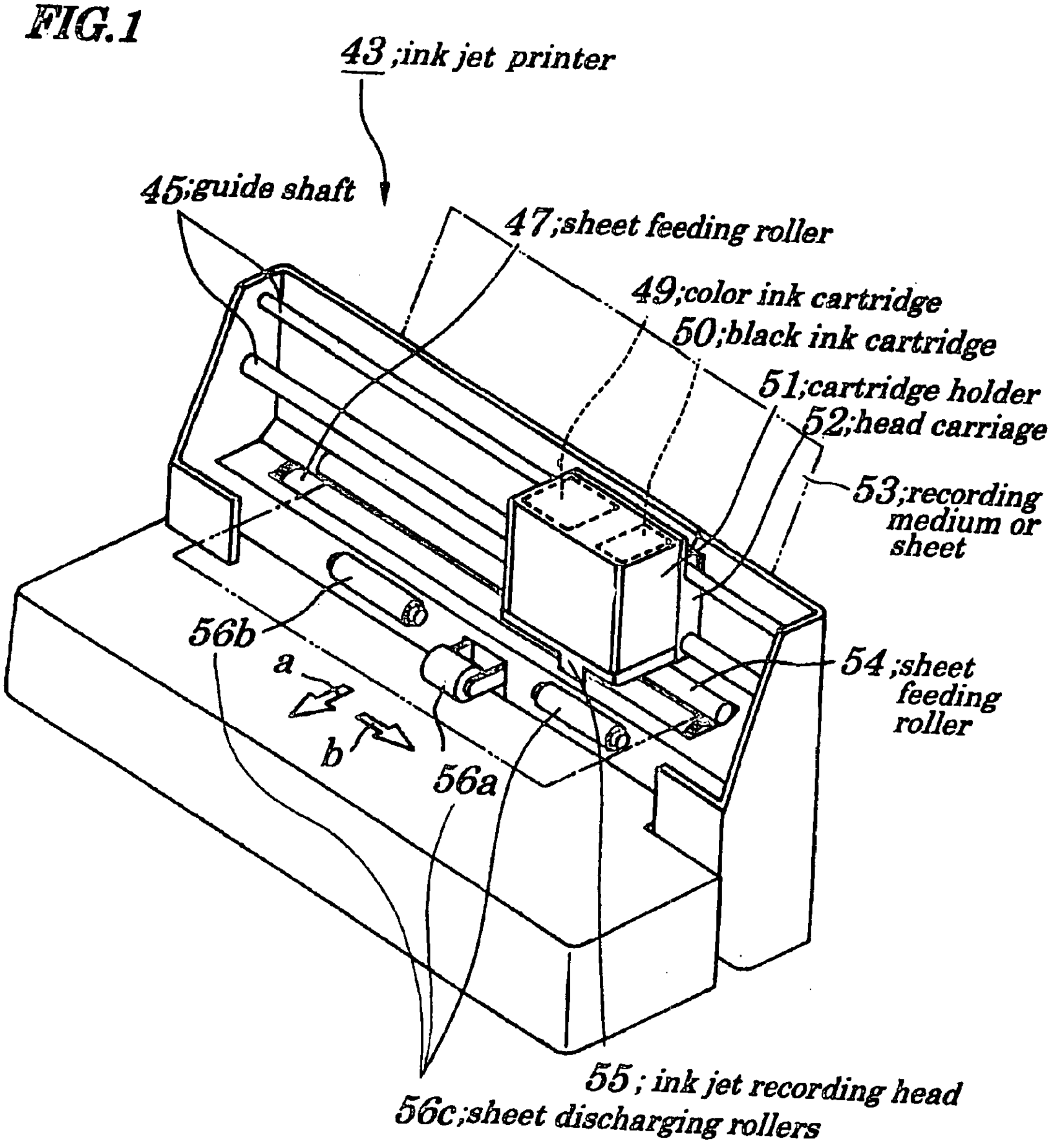
FIG. 1 is a perspective view of the ink jet recording apparatus or printer according to the embodiment of the present invention, illustrating an entire arrangement of the ink jet recording apparatus or printer of the present invention.

FIG. 1 shows one embodiment of an ink jet recording head 55 of the present invention mounted on an ink jet printer 43.

The ink jet printer 43 comprises: a guide shaft 45, which laterally extends inside a main body of the ink jet printer 43 and is fixedly mounted the main body; a head carriage 52, which is driven by an appropriate driver such as a stepping motor or the like (not show) to reciprocate along the guide shaft 47; and, a control portion (not shown) for systematically controlling the ink jet printer 43 in recording or printing operations.

In addition, the main body of the ink jet printer 43 is provided with a pair of sheet feeding rollers 47, 54 for feeding a recording medium or sheet 53, wherein the roller 54 forms a pinch roller which is brought into press-contact with the other feeding roller 47 to sandwich the recording medium or sheet 53 therebetween in feeding operation of the recording medium or sheet 53.

In printing or recording operation of a text, for example, the recording medium or sheet 53 is intermittently fed or moved forward at predetermined print-line intervals by the sheet feeding rollers 47, 54 in a direction indicated by the arrow "a", as viewed in FIG. 1, wherein the sheet feeding rollers 47, 54 are interlocked with a head carriage 52 in operation. As is clear from FIG. 1, disposed in front of the sheet feeding rollers 47, 54 are a plurality of sheet discharging rollers 56*a*, 56*b* and 56*c* by which the recording medium or sheet 53 has its rear surface supported in its recording or printing operation.

The head carriage 52 is provided with: a cartridge holder 51, mounted in which are a black ink cartridge 50 adapted for alphanumerical text printing and a color ink cartridge 49 adapted for color image or pattern printing; and, the ink jet recording head 55 for ejecting ink droplets to the recording medium or sheet 53.

In recording or printing operation, the black ink cartridge 50 delivers the black ink to the ink jet recording head 55. More specifically, the black ink supplied from the black ink cartridge 50 is received in a single common ink reservoir 40 (shown in FIG. 2) which assumes a U-shaped form to communicates with a plurality of pressure generating chambers 19, as is clear from FIG. 2. In this embodiment of the present invention, each of these pressure generating chambers 19 is then filled with the black ink issued from the U-shaped common ink reservoir 40 shown in FIG. 2. Under such circumstances, when ejection of ink droplets of the black ink onto the recording medium or sheet 53 is required, a corresponding one of a plurality of electrodes 22 of a piezoelectric element 20 mounted on a vibrating plate 23 is energized to have a desired portion of the vibrating plate 23 vibrated, which intermittently increases a pressure of an interior of a corresponding one of the pressure generating chambers 19 to produce therein a pressure pulse which gives ink discharging energy to the ink in the corresponding one of the pressure generating chambers 19. As a result, the ink thus energized in the corresponding one of the pressure generating chambers 19 is ejected outward through a corresponding one of a plurality of ink ejection nozzles 41 (shown in FIG. 2) to form ink droplets which hit and adhere to a surface of the recording medium or sheet 53, and thereby accomplishing their printing or recording purpose, wherein the corresponding one of the ink ejection nozzle 41 is communicated with the corresponding one of the pressure generating chambers 19, as is clear from FIG. 2.

On the other hand, each of a plurality of different color inks supplied from the color ink cartridge 49 enters a corresponding one of a plurality of the color ink reservoirs (not shown), and passes through it to fill a corresponding one of their pressure generating chambers 19. In the corresponding pressure generating chamber 19, when each of the color inks is energized through actuation of a corresponding one of the plurality of the electrodes 22 in the piezoelectric element 20, each of the color inks thus energized is ejected outward through the corresponding color ink ejection nozzle 41 to form color ink droplets which hit the surface of the recording medium or sheet 53 and adhere thereto, so that the thus energized one of the color inks accomplishes its printing or recording purpose.

Figure 2:
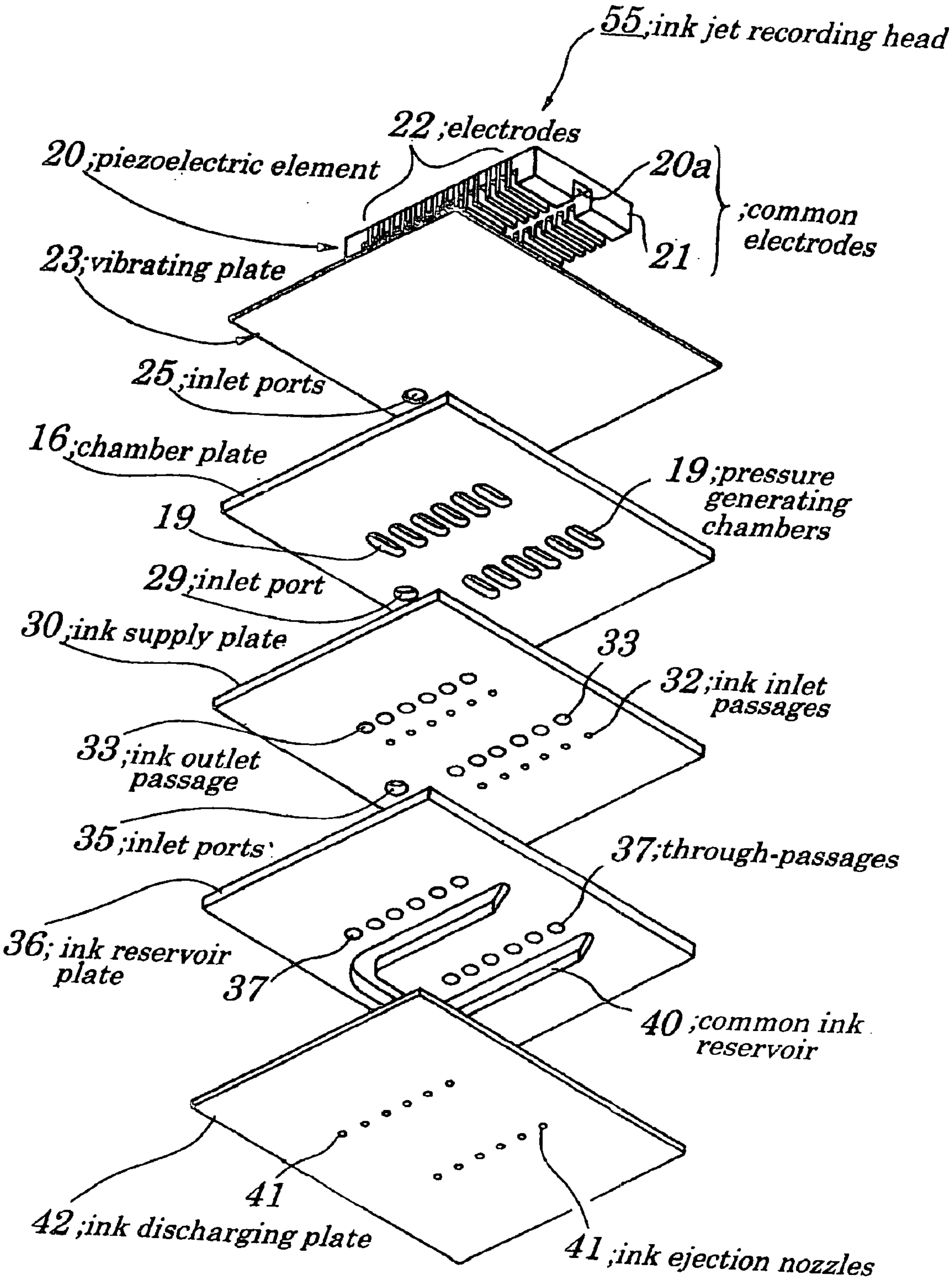
FIG. 2 is an exploded perspective view of the ink jet recording head of the embodiment of the present invention shown in FIG. 1.

FIG. 2 shows an exploded perspective view of an essential part of the ink jet recording head 55 of the embodiment of the present invention shown in FIG. 1. As is clear from FIG. 2, the ink jet recording head 55 of the present invention has a construction adapted for both the black ink cartridge 50 and the color ink cartridge 49.

More particularly, the ink jet recording head 55 of the present invention is provided with the piezoelectric element 20 which comprises: a plurality of the individual electrodes 22 the number of which corresponds to that of the ink ejection nozzles 41; and, a pair of common electrodes 20*a*, 21 electrically connected with all the individual electrodes 22.

Figure 3:
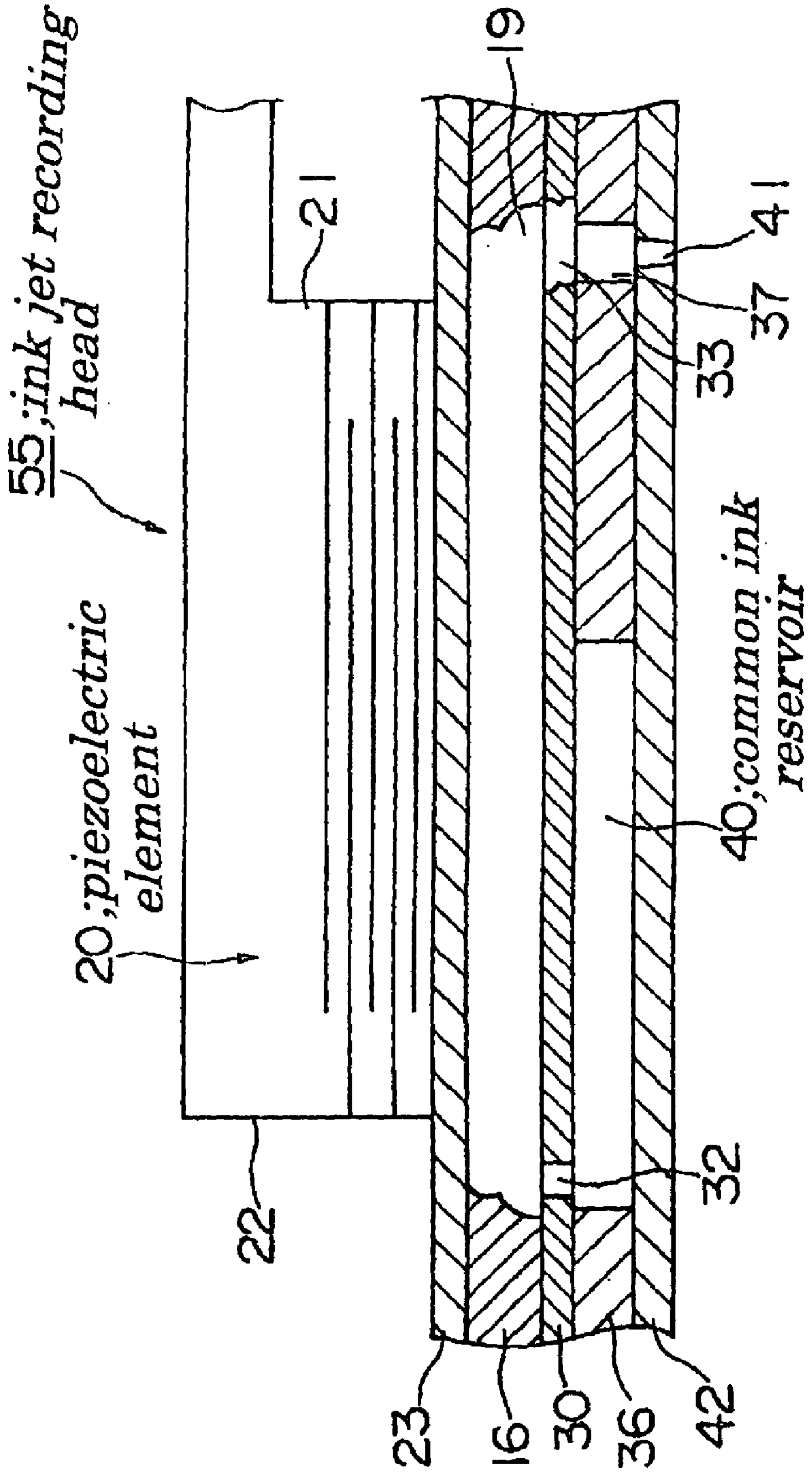
FIG. 3 is a cross-sectional view of an essential part of the ink jet recording head of the present invention, taken along the line passing through a longitudinal axis of one of the pressure generating chambers of the ink jet recording head of the embodiment of the present invention shown in FIG. 2 to illustrate assembly operations of the ink jet recording head of the present invention.

In arrangement, as is clear from FIG. 3, the piezoelectric element 20 is disposed adjacent to an upper surface of the vibrating plate (second plate) 23, and brought into close contact therewith, wherein the vibrating plate 23 faces the pressure generating chambers 19. In operation, when a desired one of the electrodes 22 in the piezoelectric element 20 is energized, the thus energized electrode 22 of the piezoelectric element 20 causes a corresponding portion of the vibrating plate 23 to vibrate, which produces a pressure pulse in the corresponding one of the pressure generating chambers 19 to have the ink therein ejected through the corresponding ink ejection nozzle 41 outward. In addition to the above components 20, 23, the ink jet recording head 55 further comprises: a chamber plate (first plate) 16 provided with a through-hole, wherein the chamber plate 16 has its upper surface brought into close contact with a lower surface of the vibrating plate 23, and has its lower surface brought into close contact with an upper surface of a ink supply plate (third plate) 30; an ink reservoir plate 36 having its upper surface brought into close contact with a lower surface of the ink supply plate 30 and its lower surface brought into close contact with an upper surface of an ink discharging plate 42; and, the ink discharging plate 42 provided with the plurality of the ink ejection nozzles 41, as shown in FIG. 2.

More specifically, in construction, as is clear from FIG. 2, the vibrating plate 23 is provided with an ink supply or inlet port 25 in its outer peripheral portion. On the other hand, the chamber plate 16 is provided with: an ink supply or inlet port 29 which communicates with the corresponding ink supply or inlet port 25 of the vibrating plate 23; and, the plurality of the pressure generating chambers 19 which communicate with the U-shaped single common ink reservoir 40, wherein each of the pressure generating chambers 19 is formed of each of a plurality of the through-holes of the chamber plate 16, and these through-holes are arranged into a pair of rows arranged parallel to each other, as shown in FIG. 2.

As is clear from FIG. 2, the ink supply plate 30 is provided with: an ink supply or inlet port 35 which communicates with the corresponding ink supply or inlet port 29 of the chamber plate 16; a plurality of ink inlet passages 32 arranged into a pair of rows arranged parallel to each other, wherein each of these ink inlet passages 32 communicates with a corresponding one of the pressure generating chambers 19 of the chamber plate 16 and disposed in the upstream side of such a corresponding one of the pressure generating chambers 19, as is clear from FIG. 3; and, a plurality of ink outlet passages 33 arranged into a pair of rows arranged parallel to each other, wherein each of these ink outlet passages 33 communicates with a corresponding one of the pressure generating chambers 19 of the chamber plate 16, and is disposed in the downstream side of such a corresponding one of the pressure generating chambers 19 so as to be disposed adjacent to a corresponding one of the rows of the ink inlet passages 32, as shown in FIG. 2.

On the other hand, formed in the ink reservoir plate 36 are: a plurality of through-passages 37, each of which communicates with a corresponding one of the ink outlet passages 33 of the ink supply plate 30, and also communicates with a corresponding one of the ink ejection nozzles 41 of the ink discharging plate 42; and, the U-shaped single common ink reservoir 40, which communicates with all the plurality of the ink inlet passages 32.

Disposed adjacent to the lower surface of this ink reservoir plate 36 is an upper surface of the ink discharging plate 42 which is provided with a plurality of the ink ejection nozzles 41, wherein these ink ejection nozzles 41 are arranged into a pair of rows arranged parallel to each other in a manner such that each of these ink ejection nozzles 41 communicates with a corresponding one of the through-passages 37 of the ink reservoir plate 36. In the ink jet recording head 55 of the present invention having the above construction, each of the through-passages 37 of the ink reservoir plate 36 is connected with a corresponding one of the ink outlet passages 33 of the ink supply plate 30 to form an elongated ink outlet passage, as is clear from FIG. 3.

FIG. 3 shows a cross-sectional view of an essential part of the ink jet recording head 55 of the present invention having the above construction, taken along a cutting line passing through a longitudinal axis of one of the pressure generating chambers 19 to illustrate the assembly operations of the ink jet recording head 55 of the present invention, wherein the above cutting line also passes through a central concave portion forming one of the common electrodes 20*a*, 21 (shown in FIG. 2) of the piezoelectric element 20. An individual electrode 22 of the piezoelectric element 20 is fixedly mounted on a corresponding portion of an upper surface of the vibrating plate 23.

In construction, bonded to the lower surface of this vibrating plate 23 is an upper surface of the chamber plate 16, wherein the chamber plate 16 is made of a stainless steel such as SUS304 or like steels, or made of any other suitable metal or alloys such as nickel or the like. On the other hand, bonded to a lower surface of the chamber plate 16 thus bonded to the lower surface of the vibrating plate 23 is an upper surface of the ink supply plate 30, as is clear from FIG. 4. Further, the ink supply plate 30 thus bonded to the chamber plate 16 has its lower surface bonded to an upper surface of the ink reservoir plate 36, as shown in FIG. 3 which also shows the ink discharging plate 42 which has its upper surface bonded to a lower surface of the ink reservoir plate 36.

In the ink jet recording head 55 of the present invention having the above construction, the chamber plate 16 is provided with the through-hole forming the pressure generating chamber 19, and has the pressure generating chamber 19 sandwiched between: the vibrating plate 23, which is mounted on the chamber plate 16; and, the ink supply plate 30, on which the chamber plate 16 is mounted. As a result, the pressure generating chamber 19 is defined by the chamber plate 16, the vibrating plate 23 and the ink supply plate 30, as is clear from FIG. 4. Any one of the pressure generating chambers 19 thus defined in the above description communicates with the U-shaped single common ink reservoir 40 through the corresponding ink inlet passages 32.

In printing or recording operations, any one of the black ink cartridge 50 and a plurality of different color ink cartridges 49 supplies its own ink to the corresponding ink reservoir 40 through a series of the above-mentioned ink supply or inlet ports 25, 29 and 35 to fill the ink reservoir 40 with its own ink. The ink thus received in the ink reservoir 40 flows out of the ink reservoir 40 to enter the ink inlet passage 32. After that, through the ink inlet passage 32, the ink then enters the corresponding one of the pressure generating chambers 19, and flows into the corresponding elongated outlet passage 33, 37. This elongated outlet passage 33, 37 is constructed of the ink outlet passage 33 and the through-passage 37 connected therewith, as already described in the above.

As is clear from FIG. 3, in construction, the elongated outlet passage 33, 37 is gradually reduced in diameter to reach the ink ejection nozzle 41. Consequently, in operation, when the piezoelectric element 20, more specifically its individual electrode 22 is energized through application of a predetermined electric current on the electrode 22, the corresponding portion of the vibrating plate 23 vibrates to intermittently increase a pressure of the interior of the corresponding pressure generating chamber 19, and thereby generating a pressure pulse which causes the ink of the corresponding pressure generating chamber 19 to be ejected from the corresponding ink ejection nozzle 41 onto the recording medium or sheet 53 (shown in FIG. 1).

Figure 4:
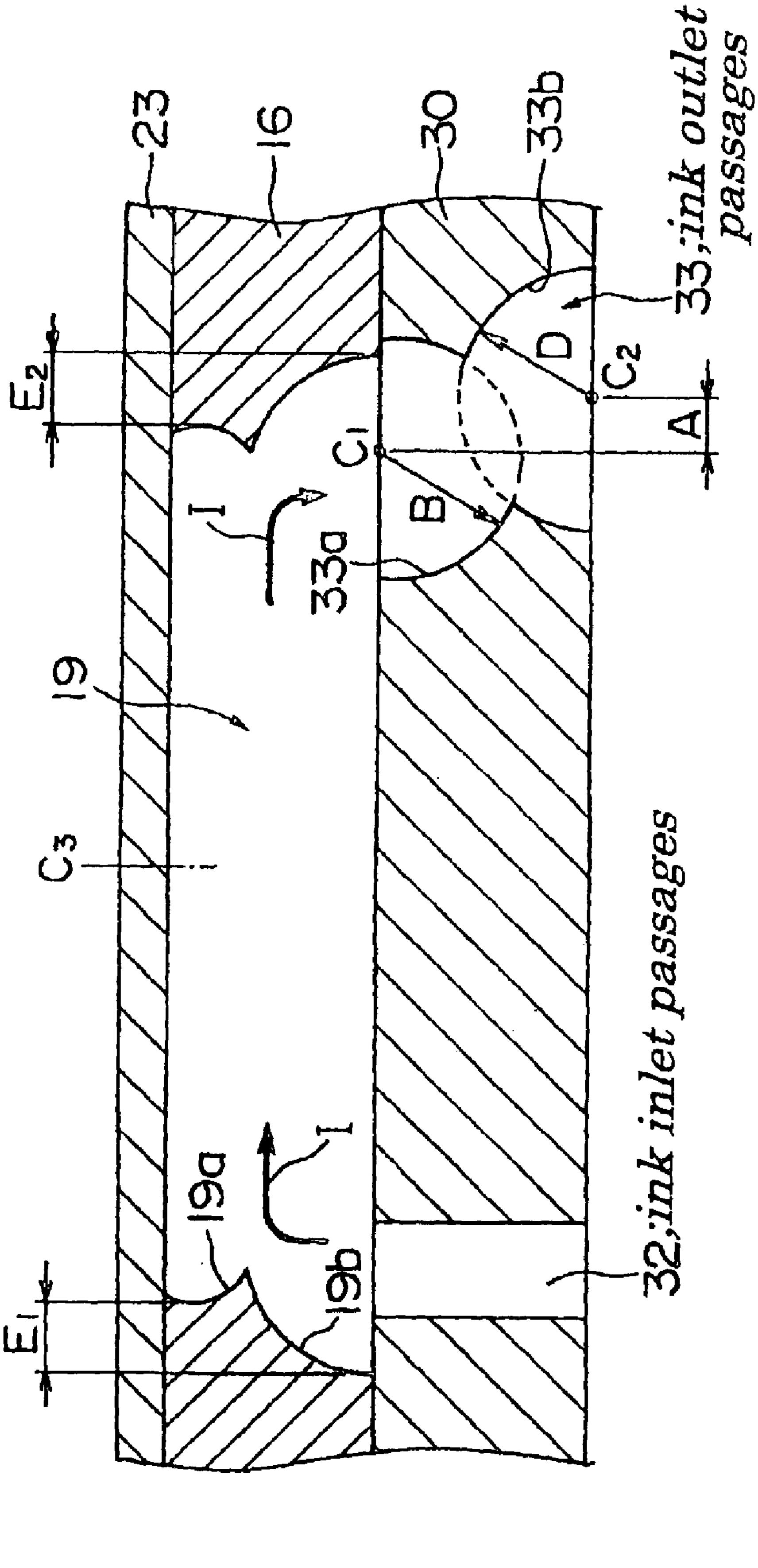
FIG. 4 is an enlarged view of an essential part in cross-section of the ink jet recording head of the present invention, illustrating the vibrating plate, the chamber plate and the ink supply plate of the ink jet recording head of the present invention shown in FIG. 3.

FIG. 4 shows an enlarged view of an essential part of the cross-sectional view of the ink jet recording head 55 of the present invention, illustrating the chamber plate 16, the vibrating plate 23, and the ink supply plate 30 of the ink jet recording head 55.

As is clear from FIG. 4, the through-hole of the chamber plate 16 forms an essential part of the pressure generating chamber 19, is constructed of an upper or first hole portion 19*a* and a lower or second hole portion 19*b*, and has: an upstream side of the upper hole portion 19*a* displaced rightward by a displacement amount "$E_1$" relative to a corresponding upstream side of the lower hole portion 19*b*; and, a downstream side of the upper hole portion 19*a* displaced leftward by a displacement amount "$E_2$" relative to a corresponding downstream side of the lower hole portion 19*b*. These displacement amounts "$E_1$" and "$E_2$" may be equal to each other, or different from each other depending on conditions in formation of the resist films 17, 18 which are applied to the opposite surfaces of the chamber plate 16 and then subjected to an etching operation, as shown in FIG. 6(*b*).

A method of the present invention for manufacturing the ink jet recording head 55 having the above construction comprises a first step of forming the through-hole of the chamber plate 16. This first step comprises the sub-steps of: forming the first resist film 17 and the second resist film 18 on the first and the second surface of the chamber plate 16, respectively, wherein the first resist film 17 and the second resist film 18 assume substantially the same shape, but are different in length from each other when measured in a direction parallel to the flow direction I (shown in FIG. 4) of the ink; and, forming the through-hole of the chamber plate 16 by etching both the first and the second surface of the chamber plate 16 with the use of the first resist film 17 and the second resist film 18 both of which serve as masks in the etching processing of the chamber plate 16.

In the above method of the present invention for manufacturing the ink jet recording head 55, preferably: a thickness of the chamber plate 16 is approximately 140 μm; and, a difference in length between the first resist film 17 and the second resist film 18 is within a range of from approximately 80 μm to approximately 140 μm.

Further, another embodiment of the present invention is a method for manufacturing the ink jet recording head 55 having the above construction. This embodiment of the method of the present invention comprises the second step of forming the ink outlet passage 33 of the ink discharge side of one of the vibrating plate 23 and the ink supply plate 30. The above second step of the method of the present invention comprises the sub-steps of: forming the first resist film 17 and the second resist film 18 on the first and the second surface of the chamber plate 16, respectively, wherein the first resist film 17 and the second resist film 18 assume substantially the same shape, but are offset from each other in a direction parallel to the flow direction I (shown in FIG. 4) of the ink; and, forming the through-hole of the chamber plate 16 by etching both the first and the second surface of the chamber plate 16 with the use of the first resist film 17 and the second resist film 18 both of which serve as masks in the etching processing of the chamber plate 16.

In the above embodiment of the method of the present invention for manufacturing the ink jet recording head 55, preferably, a thickness of the chamber plate 16 is approximately 140 μm; and, the first resist film 17 and the second resist film 18 are offset from each other by a value ranging from approximately 40 μm to approximately 70 μm.

Figure 5:
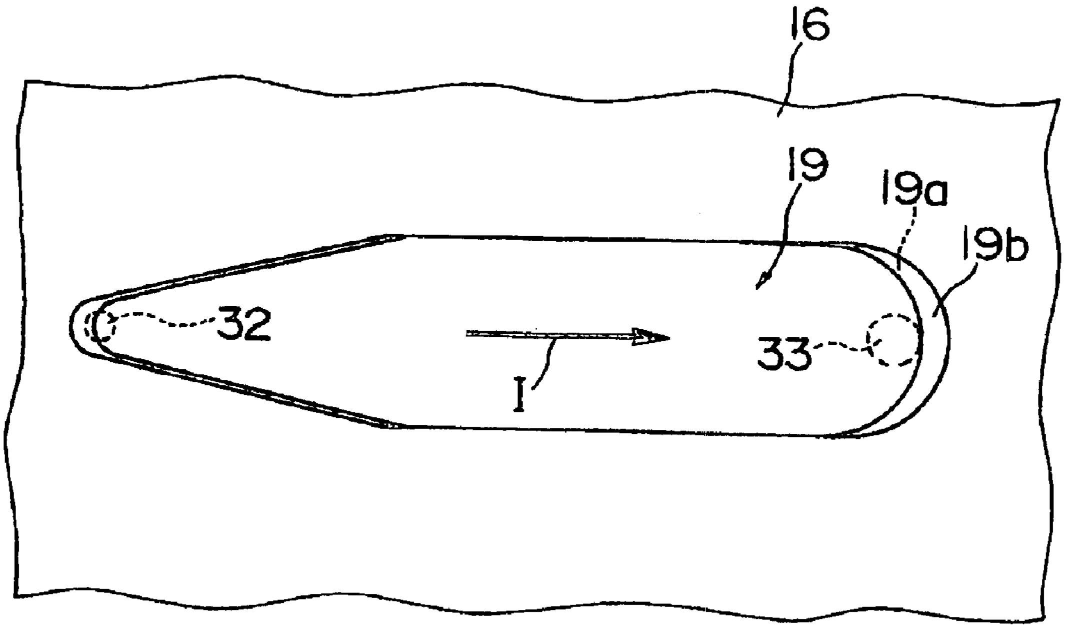
FIG. 5 is a bottom view of the chamber plate of the ink jet recording head of the present invention shown in FIG. 3.
Figure 6A:
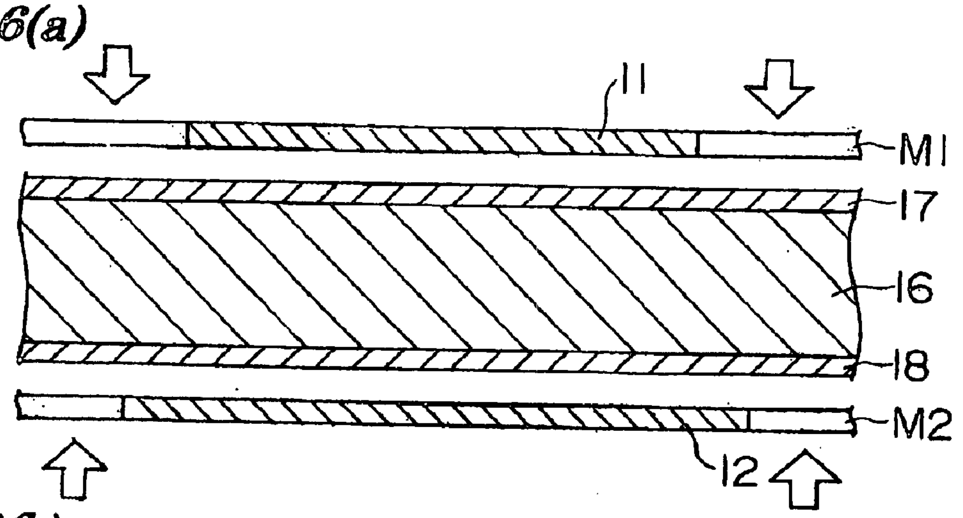
FIG. 6(*a*) is an enlarged cross-sectional view of the blank of the chamber plate used in the ink jet recording head of the present invention shown in FIG. 1, wherein the blank of the chamber plate covered with the resist films has its opposite surfaces further covered with the masks used in photo-exposure processing.
Figure 6B:
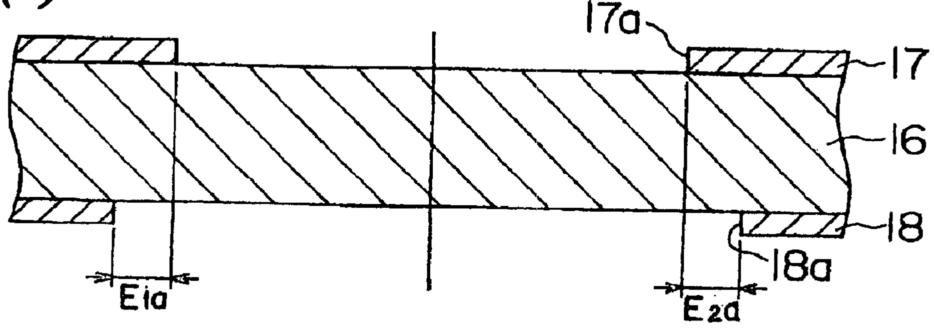
Figure 6C:
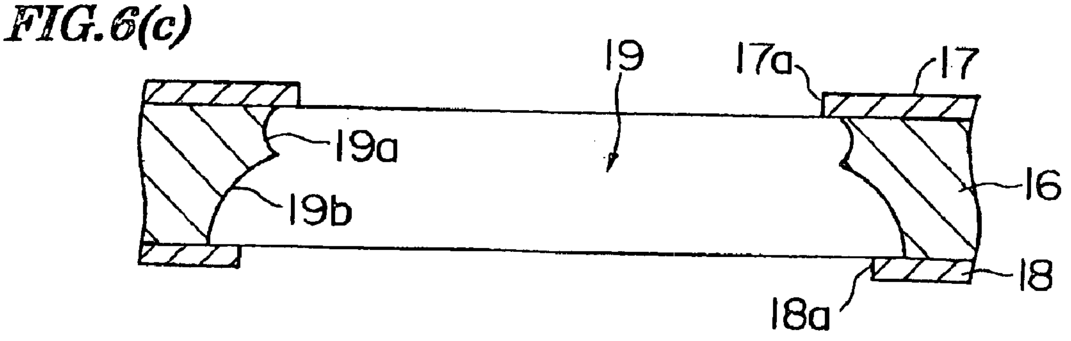
Figure 6D:
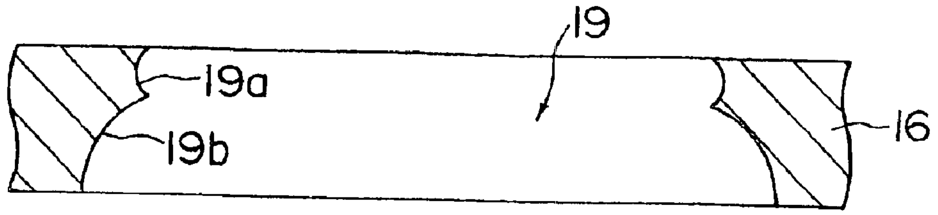

FIG. 5 shows a bottom view of the chamber plate 16 shown in FIG. 4. As is clear from FIG. 5, each of the upper hole portion 19*a* and the lower hole portion 19*b* of the through-hole (pressure generating chamber 19) of the chamber plate 16 is gradually reduced in width in the vicinity of the ink inlet passage 32, and has each of its opposite end portions formed in plan view into a substantially semicircular shape as viewed in FIG. 5, a downstream-side one of which end portions corresponds in position to the ink outlet passage 33. Incidentally, the arrow marks I shown in FIGS. 4 and 5 indicate a direction in which the ink flows.

On the other hand, as shown in FIG. 4, the ink inlet passage 32 of the ink supply plate 30 is formed through a stamping operation performed by a machine punch (not shown) so as to extend in a direction perpendicular to an upper and a lower surface (i.e., major surfaces) of the ink supply plate 30. Also, the ink outlet passage 33 communicating with the through-passage 37 of the ink reservoir plate 36 (shown in FIG. 3) has a construction in which: the ink outlet passage 33 assumes a substantially circular shape (shown in dotted line in FIG. 5) in plan view, as viewed from the first and the second surface's side of the ink supply plate 30. Further, as is clear from FIG. 4, the ink outlet passage 33 is provided with an upper or first passage portion 33*a* and a lower or second passage portion 33*b* each assuming a substantially semispherical shape. As shown in FIG. 4, in construction, the upper or first passage portion 33*a* is slightly displaced leftward (i.e., in a direction counter to the flow direction I of the ink) relative to the lower or second passage portion 33*b*.

In the upper or first passage portion 33*a* assuming the substantially semispherical shape: a center of such semispherical shape is denoted by a reference character and numeral "$C_1$"; and, a radius of the same semispherical shape is denoted by a reference character "B". On the other hand, in the lower or second passage portion 33*b* of the ink outlet passage 33 also assuming the semispherical shape: a center of such semispherical shape is denoted by a reference character and numeral "$C_2$"; and, a radius of a same semispherical shape is denoted by a reference character "D".

An amount of a horizontal component of above displacement of the upper or first passage portion 33*a* of the ink outlet passage 33 relative to the lower or second passage portion 33*b* of the same ink outlet passage 33 is denoted by the reference character "A", as shown in FIG. 4.

In the ink jet recording head 55 of the present invention having the above construction, it is possible for the ink outlet passage 33 to change in diameter each of its upper passage portion 33*a* and its lower or second passage portion 33*b*, and also possible to change its own tilt or inclination angle by appropriately changing an amount of each of: the radius "B" of the upper passage portion 33*a* and the corresponding radius "D" of the lower passage portions 33*b* of the ink outlet passage 33; and, the amount of the horizontal component of displacement "A" of the upper or first passage portion 33*a* of the ink outlet passage 33 relative to the lower or second passage portion 33*b* of the same ink outlet passage 33.

FIGS. 6(*a*), 6(*b*), 6(*c*) and 6(*d*) show a series of enlarged cross-sectional views of an essential part of the chamber plate 16 used in the ink jet recording head 55 of the present invention, illustrating the etching process of the blank of the chamber plate 16 stepwise in the above enumerated order, wherein the above etching process is performed as follows:

First, as shown in FIG. 6(*a*), the chamber plate 16 to be treated has its first and its second surface uniformly coated with the first resist film 17 and the second resist film 18, respectively. After that, a first mask M1 provided with a first mask pattern 11 and a second mask M2 provided with a second mask pattern 12, each of which mask patterns 11, 12 assumes a predetermined shape, are oppositely disposed from the first resist film 17 and the second resist film 18, respectively. Then, both the first resist film 17 and the second resist film 18 are subjected to photo-exposure processes through the first mask M1 and the second mask M2, respectively.

Figure 7A:
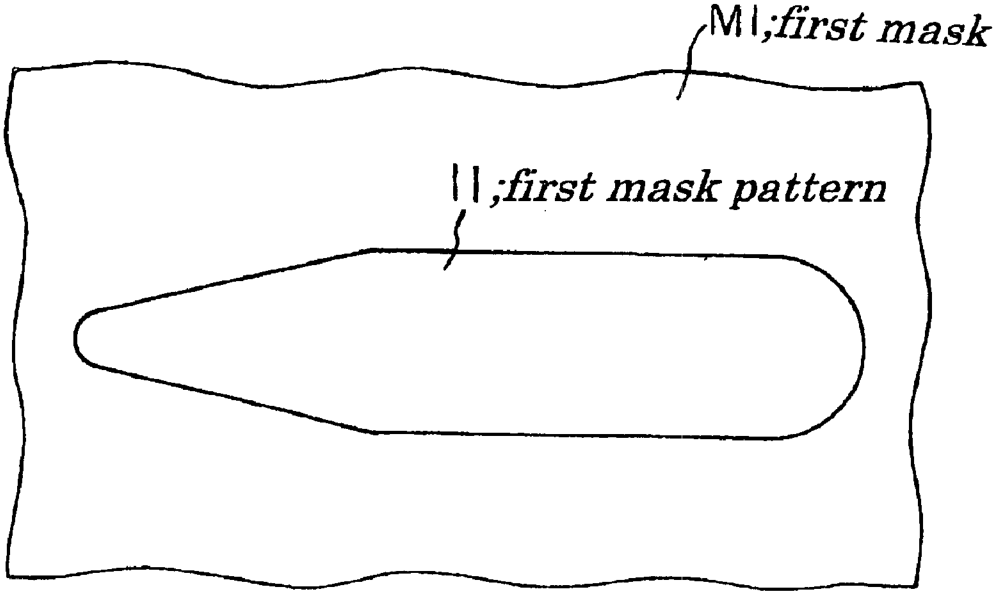
FIG. 7(*a*) is a plan view of the first mask with its mask pattern used in mask-patterning processing of the blank of the chamber plate shown in FIG. 6(*a*)
Figure 7B:
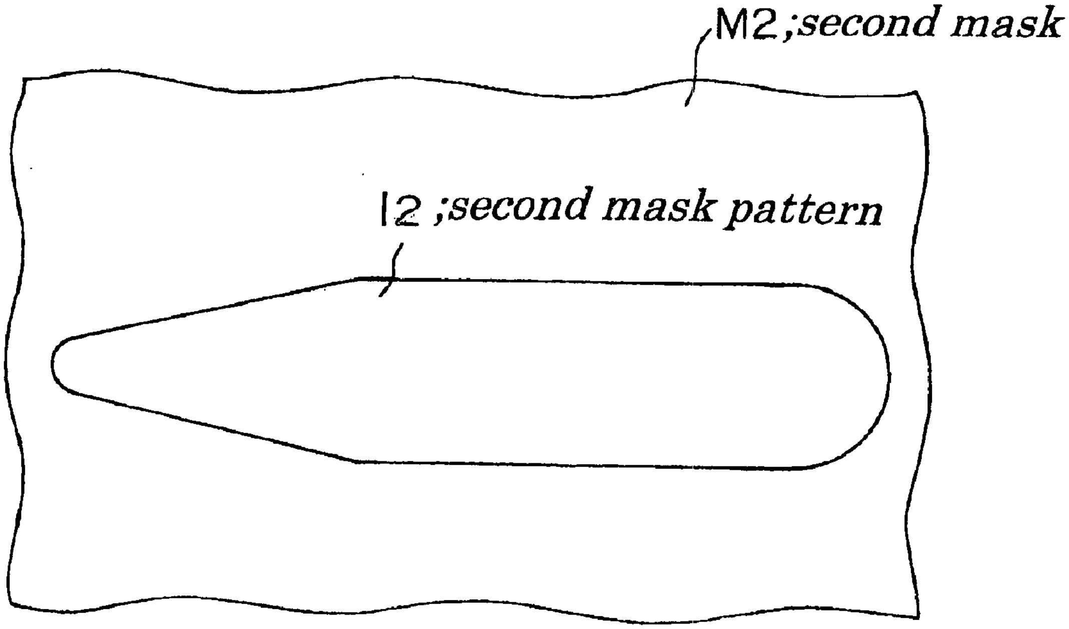

Now, the mask patterns 11, 12 will be described in detail. FIGS. 7(*a*) and 7(*b*) show plan views of each of concrete examples of the mask pattern 11 of the first mask M1 and the mask pattern 12 of the second mask M2, wherein: FIG. 7(*a*) shows the mask pattern 11 of the first mask M1; and, FIG. 7(*b*) shows the mask pattern 12 of the second mask M2. The mask pattern 11 of the first mask M1 assumes an elongated shape which has its longitudinal axis extended in a direction parallel to the flow direction I of the ink. Namely, the longitudinal axis of the mask pattern 11 laterally extends as viewed in FIG. 7(*a*). On the other hand, the mask pattern 12 of the mask M2 assumes an elongated shape which is substantially similar to that of the mask pattern 11, but slightly longer than that of the mask pattern 11 to extend in the same direction as that of the mask pattern 11.

Then, the chamber plate 16 having been subjected to the above photo-exposure process has both the first resist film 17 on its first surface and the second resist film 18 on its second surface developed and rinsed off with water, so that: these resist films 17 and 18 are provided with concave portions 17*a* and 18*a*, respectively, wherein each of the concave portions 17*a* and 18*a* assumes substantially a same pattern as that of each of the mask patterns 11 and 12 shown in FIGS. 7(*a*) and 7(*b*), as shown in FIG. 6(*b*). As is clear from FIG. 6(*b*), in construction, the concave portion 17*a* of the mask pattern 11 shown in FIG. 7(*a*) has its upstream side edge portion displaced rightward relative to a corresponding upstream side edge portion of the concave portion 18*a* of the mask pattern 12 by a displacement amount "$E_{1a}$". On the other hand, also as is clear from FIG. 6(*b*), in construction, the concave portion 17*a* of the mask pattern 11 has its downstream side edge portion displaced leftward relative to a corresponding downstream side edge portion of the concave portion 18*a* of the mask pattern 12 by a displacement amount "$E_{2a}$".

Further, as shown in FIG. 6(*c*), the upper hole portion 19*a* and the lower hole portion 19*b* are formed in an upper and a lower portion of the chamber plate 16, respectively, through a wet-etching process called a "half etching" process with a use of a predetermined etching liquid. In this embodiment of the ink jet recording head 55 of the present invention, the upper hole portion 19*a* of the chamber plate 16 is larger in horizontal area than the corresponding concave portions 17*a* of the resist film 17. On the other hand, the lower hole portion 19*b* of the chamber plate 16 is larger in horizontal area than the corresponding concave portion 18*a* of the resist film 18.

After that, as shown in FIG. 6(*d*), the first resist films 17 and the second resist film 18 adhered to the first and the second surface of the chamber plate 16, respectively, are rinsed off with water and removed through a spin dry process or like suitable processes. As a result, the chamber plate 16 provided with the through-hole is obtained. The through-hole of the thus obtained chamber plate 16 is constructed of the upper hole portion 19*a* and the lower hole portion 19*b* to form the pressure generating chamber 19 therein, and has: an upstream side of the upper hole portion 19*a* displaced rightward by the displacement amount "$E_1$" relative to the corresponding upstream side of the lower hole portion 19*b*, as shown in FIG. 4; and, a downstream side of the upper hole portion 19*a* displaced leftward by the displacement amount of "$E_2$" relative to the corresponding downstream side of the lower hole portion 19*b*, as shown in FIG. 4.

Bonded to an upper surface of the chamber plate 16 thus obtained through the above processes or process steps is a lower surface of the vibrating plate 23, as viewed in FIG. 4. On the other hand, bonded to a lower surface of the thus obtained chamber plate 16 is an upper surface of the ink supply plate 30. Further bonded to a lower surface of this ink supply plate 30 is an upper surface of the ink reservoir plate 36 which has its lower surface bonded to an upper surface of the ink discharging plate 42. The essential part of the ink jet recording head 55 according to this embodiment of the present invention has the above construction.

In this embodiment of the present invention, when a thickness of the chamber plate 16 is approximately 140 μm, the amount of leftward displacement, i.e., "$E_1$" of the upper hole portion 19*a* of the through-hole 19 of the chamber plate 16 shown in FIG. 4 is preferably within a range of from approximately 40 μm to approximately 70 μm, and more preferably approximately 60 μm. In this embodiment of the present invention, as shown in FIG. 6(*b*), when the thickness of the chamber plate 16 is approximately 140 μm, a difference ("$E_{1a}$"+"$E_{2a}$") in length between the first resist film 17 and the second resist film 18 is within a range of from approximately 80 μm to approximately 140 μm, provided that the difference ("$E_{1a}$"+"$E_{2a}$") in length is measured in a direction parallel to the flow direction I (shown in FIG. 4) of the ink.

The upper or first passage portion 33*a* and the lower or second passage portion 33*b* both of the ink outlet passage 33 may be formed through substantially the same process as that for forming the pressure generating chamber 19 shown in FIGS. 6(*a*), 6(*b*), 6(*c*) and 6(*d*).

More specifically, the ink outlet passage 33 is formed in the ink supply plate 30 as follows: namely, an appropriate mask provided with a predetermined mask pattern having been already patterned is applied to each of an upper and a lower surface of a blank of the ink supply plate 30. Then, the blank of the ink supply plate 30 having its opposite surfaces (i.e., its upper and its lower surface) covered with the predetermined masks is subjected to photo-exposure processing.

After that, a resist film is formed on each of the upper or first and the lower or second surface of the blank of the ink supply plate 30 through a series of predetermined treatments. Then, the blank of the ink supply plate 30 having its opposite surfaces coated with the resist films is subjected to an etching process called "half etching" process, so that the upper or first passage portion 33*a* and the lower or second passage portion 33*b* both of the ink outlet passage 33 are formed. In practice, each of the upper or first passage portion 33*a* and the lower or second passage portion 33*b* thus formed in the ink outlet passage 33 is larger in size than a corresponding aperture portion of each of the resist films 17, 18.

After completion of the formation of these passage portions 33*a*, 33*b* of the ink outlet passage 33 in the blank of the ink supply plate 30, the resist films 17, 18 adhered to the opposite surfaces of the blank of the ink supply plate 30 are removed, so that the blank is formed into the ink supply plate 30. In the thus formed ink supply plate 30, as viewed in FIG. 4, in construction, the center "$C_1$" of the upper or first passage portion 33*a* of the ink supply plate 30 is displaced leftward by a displacement amount "A" relative to the center "$C_2$" of the lower or second passage portion 33*b* of the ink supply plate 30.

As described above, in this embodiment of the present invention, it is possible to form the ink supply plate 30 through the "half etching" process, wherein a longitudinal axis of the ink outlet passage 33 of the ink supply plate 30 is tilted or inclined as a whole at a desired inclination angle relative to the opposite major surfaces of the ink supply plate 30, as is clear from FIG. 4.

When the thickness of the ink supply plate 30 is approximately 140 μm, the above displacement amount "A" of the center "$C_1$" of the upper or first passage portion 33*a* of the ink supply plate 30 relative to the center "$C_2$" of the lower or second passage portion 33*b* of the ink supply plate 30 is preferably within a range of from approximately 40 μm to approximately 70 μm, and more preferably approximately 60 μm.

In the method of the present invention for manufacturing the ink jet recording head 55 (shown in FIG. 3), it is possible for the pressure generating chamber 19 to have its inner wall surface smoothed by forming both its upper hole portion 19*a* and its lower hole portion 19*b*, as shown in FIG. 4. While these hole portions 19*a*, 19*b* of the chamber plate 16 assume substantially the same shape as shown in FIG. 5, they are slightly different in length from each other when measured in a direction parallel to the flow direction I of the ink. Since the inner wall surface of the pressure generating chamber 19 in the chamber plate 16 is smoothed as described above, it is possible for the pressure generating chamber 19 to have each of its essential opposite-end portions (i.e., its upstream-end and its downstream-end portion) formed into a smoothed configuration as shown in FIG. 3. Of these essential opposite-end portions of the pressure generating chamber 19, the thus smoothed downstream-side portion of the pressure generating chamber 19 has the flow direction I of the ink changed so that the ink flows to the ink ejection nozzle 41. Due to such smoothness of the inner wall portion of the pressure generating chamber 19 in the chamber plate 16, it is possible for the ink jet recording head 55 of the present invention: to prevent any stagnation in the ink flow, formation of vapor bubbles, cavitation, or like troubles from occurring in the ink flow; to realize an excellent ink ejection operation, and thereby realizing a high quality gradation expression in printing or recording operations; and, to lessen a degree of a required accuracy both in dimension or in alignment of its individual components which are stacked in the assembly operations.

Figure 8:
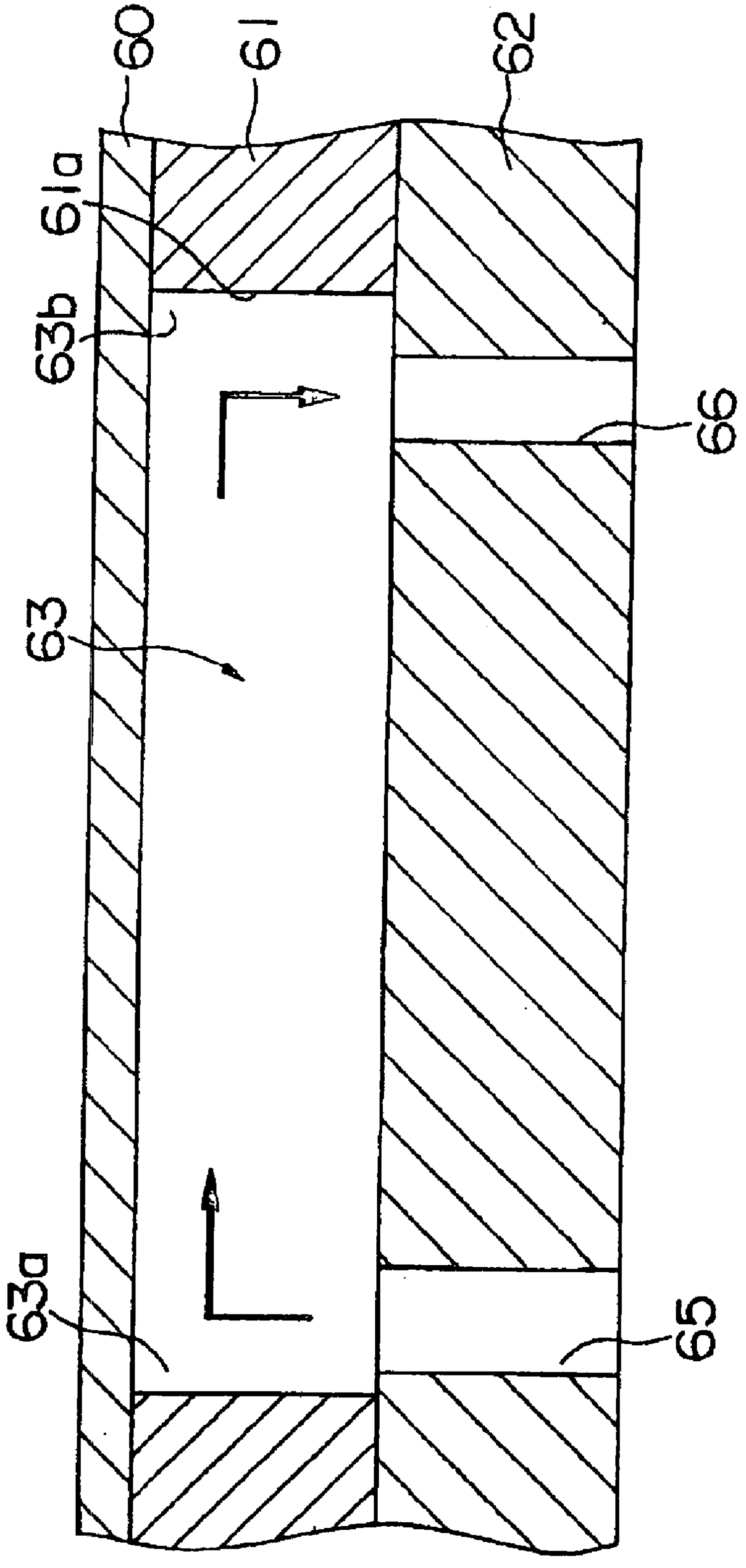
FIG. 8 (PRIOR ART)
FIG. 8 is an enlarged cross-sectional view of an essential part of the conventional ink jet recording head, illustrating the pressure generating chamber and its peripheral portions.

In contrast with the ink jet recording head 55 of the present invention described above, the conventional ink jet recording head such as shown in FIG. 8 is provided with its chamber plate 61 which is different in configuration from the chamber plate 19 of the present invention.

More specifically, in the conventional chamber plate 61, as is clear from FIG. 8, a through-hole is so formed to be straight in a direction perpendicular to the major surfaces (i.e., opposite surfaces) of the conventional chamber plate 61. As a result, in the conventional ink jet recording head shown in FIG. 8, when the chamber plate 61 is combined with the ink supply plate 62, it is necessary to have the conventional ink outlet passage 33 reduced in diameter in order to have the ink outlet passage 33 positioned within an area of the corresponding through-passage 37 of the ink reservoir plate 36 without fail. Incidentally, in the description here, the reference numerals in parentheses used as to the components of the conventional ink jet recording head indicate the corresponding components of the ink jet recording head 55 of the present invention.

In the conventional ink jet recording head having the above construction, however, since the corresponding through-passage 37 of the ink reservoir plate 36 disposed in the downstream side of the ink outlet passage 33 is larger in diameter than the ink outlet passage 33, the ink passing through the pressure generating chamber 63 changes its flow path at substantially right angles in the vicinity of the ink outlet passage 33 to produce turbulent flow, and thereby often causing microscopically rapid changes in pressure of the ink flow to produce cavitation therein. Further, since a shoulder portion is formed between these conventional plates, chamber plate 61 and ink supply plate 62 thus stacked with each other and disturbs the ink flow, i.e., since the ink flow directly hits such shoulder portion, some stagnation in the ink flow occurs in the vicinity of the above shoulder portion in the conventional ink jet recording head. In order to prevent the above-mentioned problems such as cavitation and stagnation of the ink flow from occurring in the ink flow, it is necessary for the conventional ink jet recording head to assemble or stack its components or chamber plate 61 and ink supply plate 62 with each other with an alignment accuracy of at least ±10 μm.

In contrast with this, in the ink jet recording head 55 of the present invention, since the inner wall surface of the pressure generating chamber 19 is made smooth in configuration, it is possible for the ink jet recording head 55 of the present invention to remarkably lessen a degree of required accuracy both in dimension and in alignment of its individual components which are assembled into (i.e., stacked together to form) the ink jet recording head 55.

Further, in this embodiment of the ink jet recording head 55 of the present invention, as is clear from FIG. 4, it is possible to positively tilt or incline the flow direction of the ink by the use of the configuration of the ink outlet passage 33 without changing in diameter each of the ink inlet passage 32 disposed in the upstream side of the ink flow I and the ink outlet passage 33 disposed in the downstream side of the ink flow I, and also possible to offset in position these ink inlet passage 32, ink out passage 33 from each other in accordance with an inclination angle of a desired one of the ink inlet passage 32, ink out passage 33.

For example, when a thickness of the chamber plate 16 is approximately 140 μm in a condition in which its upper mask pattern and its lower mask pattern are offset from each other by approximately 60 μm, it is possible to tilt or incline the direction of the ink flow by an inclination angle of approximately 25 degrees with respect to a plane perpendicular to the opposite surfaces (i.e., major surfaces) of the chamber plate 16, wherein the ink flows along the inner wall surfaces of both the upper hole portion 19*a* and the lower hole portion 19*b* of the pressure generating chamber 19 in the chamber plate 16. In this case, it is possible to prevent the ink flow I from being drastically changed even when the inner wall surface of the downstream side of each of these hole portions 19*a*, 19*b* of the pressure generating chamber 19 is broadened. Consequently, in the ink jet recording head 55 of the present invention, it is possible to lessen a degree of the required alignment accuracy of its components or plates in their assembly or stacking operation to a remarkably lower level of approximately ±20 μm.

In the above description, while the present invention has been particularly shown and described with reference to its preferred embodiments shown in the accompanying drawings, it will be understood by those skilled in the art that various changes and modifications in form and details may be made therein without departing from the spirit and scope of the present invention as defined by appended claims. Consequently, both the ink jet recording head of the present invention and the method of the present invention for manufacturing the ink jet recording head are not limited to the preferred embodiments only, but include any changes and modifications in construction of these preferred embodiments, which changes and modifications may be made without departing from the spirit and scope of the present invention.

As is clear from the above description, the present invention has the following effects: namely, both the ink jet recording head 55 of the present invention and the method of the present invention for manufacturing this ink jet recording head 55 are capable of: preventing any of stagnation in the ink flow, formation of vapor bubbles, cavitation, or like problems from occurring in the ink flow; realizing the excellent ink ejection operation, and thereby realizing the high quality gradation expression in printing or recording operations; and, remarkably lessening a degree of required accuracy both in dimension and in alignment of its individual components which are assembled into (i.e., stacked together to form) the ink jet recording head 55 of the present invention.

Further, both the ink jet recording head 55 of the present invention and the method of the present invention for manufacturing the ink jet recording head 55 are capable of forming the ink flow passage which is tilted or inclined from the major surface of its individual component or plate even when the ink flow passage is formed in the major surfaces of such component or plate through an etching operation.

It is thus apparent that the present invention is not limited to the above embodiments but may be changed and modified without departing from the scope and spirit of the invention.

Finally, the present application claims the Convention Priority based on Japanese Patent application No. Hei 11-081064 filed on Mar. 25, 1999, the disclosures of which are totally incorporated herein by reference.

What is claimed is:

1. A method for manufacturing an ink jet recording head provided with a pressure generating chamber, wherein the pressure generating chamber is constructed of a first plate, a second plate and a third plate, wherein the first plate is provided with a through-hole and sandwiched between the second plate and the third plate, the method comprising:

forming a first resist film and a second resist film on a first surface and a second surface of said first plate, respectively, wherein said first resist film and said second resist film assume substantially a same shape, but are different in length from each other when measured in a direction parallel to a flow direction of ink; and forming said through-hole in said first plate by etching both said first surface and said second surface of said first plate with the use of said first resist film and said second resist film both of which serve as masks in said etching processing of said first plate.

2. The method for manufacturing the ink jet recording head according to claim 1, wherein a thickness of said first plate is approximately 140 $\mu$m, and wherein a difference in length between said first resist film and said second resist film is within a range from approximately 80 $\mu$m to approximately 140 $\mu$m.

3. The method according to claim 1, wherein said first plate comprises a pair of sides with substantially smooth surfaces.

4. The method according to claim 3, wherein said first mask comprises an elongated shape with a longitudinal axis extending in a direction parallel to said flow direction of said ink.

5. The method according to claim 1, wherein said first plate is comprised of at least one of a metal and a metal alloy.

6. The method according to claim 1, further comprising:

subjecting said first resist film and said second resist film to photo-exposure through a first mask and a second mask, wherein said first mask is slightly smaller than said second mask.

7. The method according to claim 6, wherein said upper hole portion and said lower hole portion are each reduced in width near an ink inlet passage.

8. The method according to claim 1, wherein said through-hole comprises an upper hole portion with an upstream side and a lower hole portion with an upstream side, said upstream side of said upper hole portion being displaced sideward in a direction parallel to said flow direction of said ink by a displacement amount relative to a corresponding said upstream side of said lower hole portion.

* * * * *